(12) United States Patent
Dalli et al.

(10) Patent No.: US 11,049,043 B2
(45) Date of Patent: Jun. 29, 2021

(54) MODEL INDUCTION METHOD FOR EXPLAINABLE A.I

(71) Applicant: UMNAI Limited, Ta' Xbiex (MT)

(72) Inventors: Angelo Dalli, Floriana (MT); Mauro Pirrone, Kalkara (MT)

(73) Assignee: UMNAI Limited, Ta'Xbiex (MT)

( * ) Notice: Subject to any disclaimer, the term of this patent is extended or adjusted under 35 U.S.C. 154(b) by 0 days.

(21) Appl. No.: 17/079,840

(22) Filed: Oct. 26, 2020

(65) Prior Publication Data
US 2021/0133630 A1 May 6, 2021

Related U.S. Application Data

(60) Provisional application No. 62/927,917, filed on Oct. 30, 2019.

(51) Int. Cl.
*G06N 20/00* (2019.01)

(52) U.S. Cl.
CPC .................... *G06N 20/00* (2019.01)

(58) Field of Classification Search
CPC ............... G06N 20/00; G06N 5/04
USPC ........................................................ 706/12
See application file for complete search history.

(56) References Cited

U.S. PATENT DOCUMENTS

| 7,480,640 B1* | 1/2009 | Elad | G06Q 10/10 706/14 |
| 2009/0030864 A1* | 1/2009 | Pednault | G06N 20/00 706/45 |
| 2019/0147369 A1* | 5/2019 | Gupta | G06N 5/045 706/12 |
| 2019/0244122 A1* | 8/2019 | Li | G06N 5/042 |
| 2019/0303404 A1* | 10/2019 | Amer | G06N 3/084 |
| 2020/0167677 A1* | 5/2020 | Verma | G06N 5/003 |
| 2020/0302318 A1* | 9/2020 | Hetherington | G06N 5/003 |

FOREIGN PATENT DOCUMENTS

WO WO-2020089597 A1 * 5/2020 ............. G06N 5/048

OTHER PUBLICATIONS

Gunning, "Explainable Artificial Intelligence (XAI)", 2017. (Year: 2017).*

* cited by examiner

*Primary Examiner* — Dave Misir
(74) *Attorney, Agent, or Firm* — Maier & Maier, PLLC

(57) ABSTRACT

A model induction method for explainable artificial intelligence (XAI) may be shown and described. A model of a black-box AI may be an input to the model induction method, along with a set of sample input data. A linear or non-linear predictor function may be used to predict the output of the black-box model, producing a set of data points. The data points may be partitioned by a partitioning function, and each partition may represent one or more rules. The data may also be transformed using a number of transformation functions, such as a polynomial expansion. A local model may be fitted to the transformed function or functions. A set of rules may be interpreted from the local models and may form a white-box AI model. Linear or non-linear data may be modeled by the white-box model. Further, the white-box model may be implemented on a low-power device.

29 Claims, 8 Drawing Sheets

Input Image

200

Office Supplies

202

Blackbox Image Analysis Output

MODEL INDUCTION METHOD FOR EXPLAINABLE A.I

FIELD

A method for extracting a model from an existing machine learning model may be shown and described.

BACKGROUND

Recent achievements in the field of machine learning have led to a tremendous number of new implementations of artificial intelligence, offering a multitude of benefits and advantages. AI algorithms outperform humans in new areas of application. Despite this success, AI may not perfect, and may still be prone to mistakes just as humans are. These mistakes often may be undetectable, unpredictable, and may have no direct intervention resolution. AI may still be implemented in mission-critical environments despite these limitations, which may lead to significant consequences when a mistake is made.

Artificial intelligence and machine learning algorithms often cannot explain their decisions and actions to human users. Thus, when a mistake is made, it may be difficult to detect and correct. As a result, a method of explaining the reasoning behind an AI's conclusions may be needed in the field.

One proposed solution is the Generalized Linear Rule Model. This method uses linear models using rule-based features and works for both regression and classification. This method may take a linear combination of decision rules, within the framework of generalized linear models (GLM). The generalized linear model method may fluster as the model and the number of rules increases, and when linear models don't adequately fit a set of rules.

Another possible solution may be found in attribution methods that offer an instance-level feature importance proportional to the feature's contribution in the model's prediction. Systems like LIME and Shapley Values probe behavior on perturbations of an input and then use that data to construct a local linear model that serves as a simplified proxy for the full model in the neighborhood of the input. Gradient based attribution methods like LRP, SmoothGrad, DeepLIFT, and DeConvNet use at least one forward and/or backward pass through the system to generate feature attributions. The resulting output from attribution methods may be a set of features along with weights which may explain which features are most important for a specific prediction.

There are additionally a number of rule extraction methods. Some of these methods may work on a neuron-level, rather than the whole network architecture level and are called decompositional techniques. These are limited in that they are model specific. Other rule extraction methods may instead employ pedagogical techniques, which may be applied to any black-box model regardless of the underlying architecture. The pedagogical approach may generate artificial data points to feed to the black-box to observe how the rules are applied.

Regardless of the technique, the models disclosed above may not be capable of modelling non-linear data without generating fine-grained rules. This may result in a highly-complex rule-based model that may be slower or less efficient than the original model. Further, the modeling of non-linear data using a typical model extraction method may produce inaccurate results or no results whatsoever. Additionally, generated models may require large amounts of storage and processing power to be effective. Network connectivity may be required in order for the model to process data.

SUMMARY

A model induction method for explainable artificial intelligence (XAI) may be shown and described. A model of a black-box AI may be an input to the model induction method, along with a set of sample input data, such as training data or synthetically generated data. The model induction method may perturbate the input data in a variety of ways using a suitable perturbation method, and the perturbated data may be merged with the sample input data. Next, a predictor function may be used to predict the output of the black-box model. The predictor function may be linear or non-linear. A set of data points may be created by the predictor function. The data points may be partitioned by a partitioning function, such that a partition of data points may represent one or more rules.

The partitioned data points may be filtered. The partitioned data points may represent data for a local model. A local model may be defined as a model applied on one partition only, whereas a global model is a model applied on the entire dataset. A local model may be fitted to each partition. The local model may be linear. The data may also be transformed using a number of transformation functions, such as a polynomial expansion. A local model may be fitted to the transformed function or functions. Finally, the transformed and fitted functions may be interpreted by the model to form rules which can be presented in symbolic logic. A combination of multiple local models may be used in a global model creation process.

The resulting set of rules may form a white-box AI model. The white-box model may be smaller in size and require less processing power to operate, as compared to the originating black-box model. Thus, the white-box model may operate as fast as or faster than the black-box model without sacrificing accuracy. Linear or non-linear data may be modeled by the white-box model. Further, the white-box model may be implemented on a low-power device and may not require internet connectivity.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Figure 1:
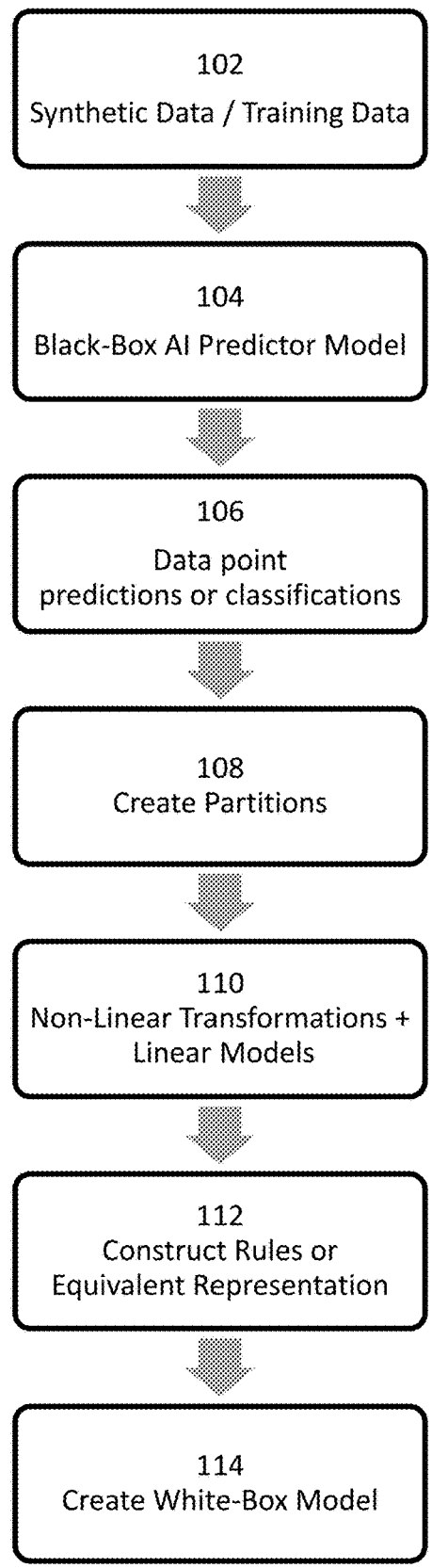
FIG. 1 is an exemplary method for extracting an explainable white-box model of a machine learning algorithm from a black-box machine learning algorithm.

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

Identifying and understanding the behavior of a black-box system may be useful in a variety of applications. Such behavior may be modelled using a system of rules or a suitable logical equivalent. The information derived from the behavior model may provide a human user with better insight as to how the black-box system came to a specific conclusion. Knowledge of the rules may allow a user to identify possible risks and errors associated with the machine learning system. As used herein, a black-box system may mean any machine learning model that has at least one uninterpretable or unexplainable or otherwise inaccessible component.

A method, system, or computer program may be disclosed for modeling data. In an exemplary embodiment, the system may model non-linear data using a combination of rules. The rules may be in any form, such as the disjunctive normal form (DNF) or conjunctive normal form (CNF). Non-linear data may be modeled by combining linear methods with non-linear transformations, such as polynomial transformations. The method may be model agnostic, such that it may be applied to any black-box system regardless of the underlying model.

An exemplary program may utilize an existing black-box model as an input predictor to an algorithm. Given some input data, the predictor model may be used to output predictions. This technique may provide useful insight in several applications. For example, a machine learning model may be analyzed to determine any incidental patterns in the training data that the model may have picked up on, and these errors may then be corrected. Further, the analysis may provide insights about the particular domain of the machine learning model. A machine learning model which provides medical diagnoses may be analyzed and explained to provide a practitioner with further insight as to which of a patient's symptoms are producing the diagnosis. The system may be implemented on any artificial intelligence or machine learning model, beyond these examples.

An exemplary system for extracting a model may involve a first step of creating input data. The input data may be any type of data, such as training data, and/or synthetic data. Each synthetic data sample may be used for testing predictions. The synthetic data may be broad enough such that the entirety of the black-box machine learning algorithm is tested. Each piece of synthetic datum may be a single variable, feature, or value. The system may then apply the synthetic data as input to a black-box system to receive a varied output of the model. In an exemplary embodiment, the system may additionally apply a perturbation of the set of synthetic data. The output may be recorded, and the algorithm may identify how each input affects the output, without otherwise analyzing the inner structure of the predictor model. Thus, the newly generated model may have a global view of the entire dataset, even if a fraction of the training data has been initially supplied.

Figure 4:
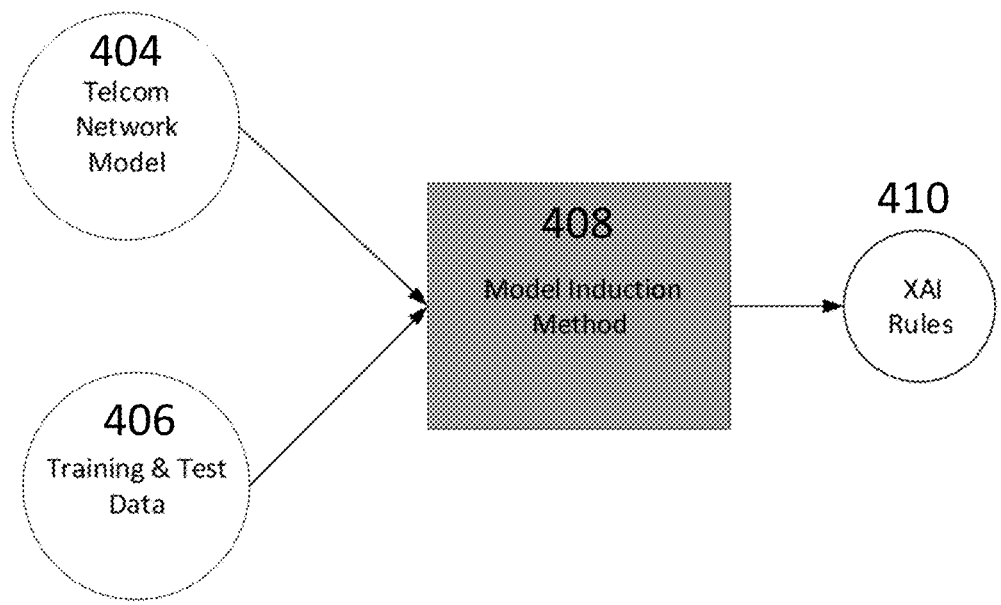
FIG. 4 is an exemplary flow chart illustrating the implementation of an exemplary model induction method.

Referring now to exemplary FIG. 4, FIG. 4 may illustrate the implementation of a model induction method. Consider the example where a black-box model is in use to detect abnormal patterns of data packets within a telecoms network and take appropriate action, such as allowing a user to remain connected, discard part of the data packets or modifying the routing priority of the network to enable faster or slower transmission. For all of these scenarios, an explanation of why such action is required is generated with our white-box model, while a black-box would simply recommend the action without any explanation. It would be both useful for the telecoms operator and the customer to understand why the model came to a conclusion. With a white-box model, one can understand which conditions and features lead to the result. Both parties have different goals. From one side, the telecoms operator is interested in minimizing security risk and maximizing network utilization, whereas the customer is interested in uptime and reliability. In one case, a customer may be disconnected on the basis that the current data access pattern is suspicious, and the customer has to close off or remove the application generating such suspicious data patterns before being allowed to reconnect. This explanation helps the customer understand how to rectify their setup to comply for the telecom operator service and helps the telecom operator from losing the customer outright, yet still minimizing the risk. The telecom operator may also benefit from this explanation. The operator may observe that the customer was rejected because of repeated breaches caused by a specific application, which may indicate that there is a high likelihood that the customer may represent an unacceptable security risk within the current parameters of the security policy applied. The operator may also benefit from observing an accompanying justification that may be generated alongside the explanation, containing a meta-explanation of how the explanation itself was generated by the white-box model. Further, a third party may also benefit from the explanation: the creator of the telecom security model. The creator of the model may observe that the model is biased such that it over-prioritizes the fast reconnect count variable over other, more important variables, and may alter the model to account for the bias.

Still referring to exemplary FIG. 4, the illustrated system may take into account a variety of factors. For example, in the illustrated system, these factors may include a number of connections in the last hour, bandwidth consumed for both upload and download, connection speed, connect and reconnect count, access point information, access point statistics, operating system information, device information, location information, number of concurrent applications, application usage information, access patterns in the last day, week or month, billing information, and so forth. The factors may each weigh differently, according to the telecom network model 404. Training and test data 406 may include examples which incorporate various values for the variables, so as to sample a wide range of data. The training and test data 406 may further include synthetically generated data, and may also be perturbated. It may also be contemplated that only the training data may be needed for the model induction method 408, while test data may be used solely for evaluating the explainable model, or XAI rules 410. The training and test data may be used as input to the model induction method, along with the telecom network model. The model induction method 408 may query the telecom network model 404 using the training and test data 406 in order to obtain an explainable model, or XAI rules 410.

In a black-box environment where predictive models typically yield higher accuracy, the model simply returns a binary outcome with a probability distribution, for example 70% yes, 30% no. Some solutions for this example using interpretable models, such as decision trees, are capable of returning a stack trace of what is the root cause of the result; however, such models typically lack the predictive performance afforded by black-box models. An exemplary embodiment renders comparable predictive power of black-box models while enabling interpretability.

Another example to illustrate some principles used by an exemplary embodiment of the invention may be the analysis of a black-box machine learning algorithm for classifying images. Synthetic data may be applied to the black-box system and may take the form of various inputs. For example, the synthetic data may include various images along with alterations of said images including optional features that may have been extracted from such images. The data may contain multiple images of each classification category. The resulting XAI model produced retains the classification capabilities of the black-box model while enabling interpretation capabilities that can be used to understand the underlying processes used to come up with the classification answer, including but not limited to areas of interest, feature patterns, heatmaps, transforms, etc. The input to the induction method may be in the form of input data points and its respective label or response (the predictor model output), together with the predictor model itself. The resulting labels or responses may be obtained via a combination of (a) training data; and/or (b) synthetically generated data; and/or (c) sampled perturbated data points obtained by dynamically querying the predictor model.

An exemplary embodiment of the modeling system may input the data into the black-box system and may record the output corresponding to each input. In another embodiment the modeling system may use a trivial predictor model, like a simple mapping function, that returns the label or response for all or part of the input data set, which is equivalent to running the induction method directly on training data. In another embodiment the modeling system may use a suitable automatic predictor building method to create the predictor model directly from the training data. The addition of the black-box or predictor model as input to the induction method may help in reducing or eliminating errors and/or noise from the original input dataset.

Data points may be initially obtained from all or part of the training data, optionally combined with synthetically generated data. Synthetically generated data may be generated via an external process, such as a simulation system, world model, etc. The input data may also be the empty set, in which case, the induction method will work using the perturbated data obtained from the input predictor model. An optional data quality assurance function may also be applied to a subset of the input data points and/or the input data as a whole prior to execution of the induction method. The induction method builds a global model by dynamically creating perturbated sample data points that are then injected in the input predictor model, which may be a black-box, and the output result is then noted and combined with all other available data points from training and/or synthetic data. It may be contemplated that perturbated data may be utilized on its own without using the original training data. An exemplary embodiment of a perturbation method may utilize a combination of: random noise addition methods, rotation perturbation, projection perturbation, k-anonymization, Generative Adversarial Networks (GANs) or any other suitable perturbation method. The resulting combined data points may form the input to the partitioning function of the induction method. Data points from the predictor model may be continuous, discrete or categorical values. Predictor models that output a classification result may have such classification applier either on (i.) discretized output, via some appropriate transformation function that assigns the appropriate class label, or (ii.) probabilistic output that can be used directly or via some appropriate transformation function.

A next exemplary step may identify a hierarchy of "partitions". Each partition may cover a set or cluster of data points retrieved from the combined data available to the induction method. Each partition may define zero, one or more rules and may optionally contain child partitions with their respective associated rules. The extracted partitions may incorporate overlapping and non-overlapping partitions. In the case of overlapping partitions, some priority function may be used to determine which partition to activate. In an alternative embodiment, if more than one partition is activated, some aggregate function may be used to combine results from the multiple activated partitions. Various methods may be implemented for finding the rules or clusters of data points pertaining to a rule, as long as each partition has sufficient data to fit a linear model and is not too complex such that a linear model may not perform well. Non-linear transformations including but not limited to polynomial expansion, rotations, dimensional and dimensionless scaling, state-space and phase-space transforms, integer/real/complex/quaternion/octonion transforms, Fourier transforms, Walsh functions, continuous data bucketization, Haar and non-Haar wavelets, generalized L2 functions, fractal-based transforms, Hadamard transforms, Type 1 and Type 2 fuzzy logic, knowledge graph networks, categorical encoding, difference analysis and normalization/standardization of data and conditional features may be applied to an individual partition, prior to the linear fit, to enhance model performance.

A partition may be a cluster that groups data points optionally according to some rule and/or distance similarity function. Each partition may represent a concept, or a distinctive category of data. Partitions that are represented by exactly one rule have a linear model which outputs the value of the prediction or classification. Since the model may be modelled linearly, the coefficients of the linear model can be used to score the features by their importance. The underlying features may represent a combination of linear and non-linear fits as the induction method handles both linear and non-linear data and/or linear and non-linear predictor models.

For example, the following are partitions which may be created in the telecom network security control application illustrated in FIG. 4:
   IF   Upload_Bandwidth>10000   AND   Reconnect_Count<=3000 THEN Connection_Approval= . . .
   IF   Upload_Bandwidth>10000   AND   Reconnect_Count>3000 THEN Connection_Approval= . . .
   IF Banwidth_In_The_Last_10_Minutes>=500000 THEN Connection_Approval= . . .
   IF   Device_Status="Idle"   AND   Concurrent_Applications<10 THEN Connection_Approval= . . .
   Etc The following is an example of the linear model which is used to predict the Connection Approval probability.

$$\text{Connection\_Approval} = \text{Sigmoid}(\theta_1 + \theta_2 \text{ Upload\_Bandwidth} + \theta_3 \text{Reconnect\_Count} + \theta_4 \text{Concurrent\_Applications} + \ldots).$$

Each coefficient $\theta_i$ may represent the importance of each feature in determining the final output, where i may represent the feature index. The Sigmoid function, which is an optional activation function, is being used in this example because it is a binary classification scenario. Another rule may incorporate non-linear transformations such as polynomial expansion, for example $\theta_i \text{Concurrent\_Applications}^2$ may be one of the features in the rule equation.

Referring to the previous example involving the classification of images, a hierarchical partition may contain rules that are identified according to certain trends in the black-box system's output corresponding to certain inputs. An exemplary modeling system may recognize that whenever a certain shape is given to the black-box system as an input, such as a paper clip, the black-box system always or almost always returns the same classification as output, such as office supplies. Note that the system might not recognize or label the paper clip as such, but rather may interpret the arrangement of grey pixels in that unique shape to be an input which often leads to an output classification of "office supplies". The system may calculate a percentage pertaining to the number of times a paper clip shape as input returns office supplies as an output, and produce a weight associated with the paper clip shape. Further, the white-box algorithm may output the details of an object which led to the classification. For example, in FIG. 2B, the paper clip was identified and labeled as such because the algorithm detected that (i.) the object contained 4 straight parallel lines, (ii.) the object contained 3 curves forming a half circle each, and (iii.) the objects in (i.) and (ii.) are contiguous. This explanation may be outputted along with the percentages. The percentage may also incorporate the accuracy with which the algorithm can predict that the detected object is correctly identified, including an error range or confidence interval representing the degree of certainty or uncertainty. The user may be presented with the output weight or percentage as an explanation of the conclusion or output classification. As a result, the user may now understand why the black-box system returns an output classification of "office supplies" corresponding to the input image. In an exemplary embodiment, the system may return the image with the paper clip highlighted or pointed out, along with a presentation of the percentage or weight given to the highlighted object.

Further, once the black-box image classifier has been analyzed by the system, a white-box model of the system may be extracted such that a user may utilize the white-box model instead of the original black-box model. The white-box model may perform the same as the black-box model while simultaneously providing explanations to the classifications or predictions which it returns. The explanation may be presented or transformed into various types of machine and human readable explanations, such as text, images, or diagrams. The explanation may be accompanied by a justification, which is a meta-explanation that shows how the white-box model generated the explanation. Further, the white-box model may be an artificial intelligence or machine learning algorithm or system.

An exemplary embodiment may be illustrated in mathematical terms. In an exemplary embodiment, X may denote the input dataset, and Predict(x) may denote the predictor model function with n outputs. X may be a matrix with m dimensions. Each dimension (m) may represent the input features of X and each output may represent the number of classes (n). The input data set may be a combination of training data and synthetic generated data. Additionally, in an exemplary embodiment Perturbate(X) may be any perturbation function to generate sample perturbed data, given some input training or test data X, where X may be a subset of the input data, some neighborhood of the input data, some suitable embedding of input/output/explanation data, or may even be trivially the empty set, in which case the perturbation function needs to query the predictor model using some form of a random or non-random pattern. $X_p$ may denote the combination of the perturbated and original input dataset, Y may denote the output from the predictor model function, such that $X_P = X \cup \text{Perturbate}(X)$, and $Y = \text{Predict}(X_P)$ The hierarchy of partitions may be represented by P through an external function Partition, such that Partition$(X_p, Y) = P$, where $P = \{P_1, \ldots, P_i, \ldots, P_k\}$ and k is equal to the number of rules in the case where each partition is defined by exactly one rule.

$R_i(x)$ may represent each rule in the $i^{th}$ partition. Each Rule ($R_i(x)$) may consist of multiple conditions, such that $R_i(x) = C_1 \wedge C_2 \wedge \ldots \wedge C_j \wedge \ldots \wedge C_q$, where q may represent the number of conditions in the rule, and $C_j$ may be the $j^{th}$ condition with respect to the input matrix x of the $i^{th}$ rule (i.e. $i^{th}$ partition). The perturbated input matrix $X_p$ may be divided into k matrices, where k is equal to the number of rules, such that $X_L$ denotes the locally filtered matrix defined by $\{x | x \in X_P \wedge R_i(x) = \text{True}\}$, such that the union of $\{X_{L1}, X_{L2}, \ldots, X_{Li}, \ldots X_{Lk}\} = X_p$ when partitions are non-overlapping. When partitions overlap on each other the union of $\{X_{L1}, X_{L2}, \ldots, X_{Li}, \ldots X_L k\} \neq X_p$. When partitions overlap each other a ranking function needs to be applied to choose the most relevant rule or be used in some form of probabilistic weighted combination method. In an alternative embodiment, if more than one partition is activated, some aggregate function is used to combine the results from multiple partitions.

A third exemplary step may involve fitting a local model to each partition, defined by $P_i$. First, $X_L$ may represent the inputs that are found in both $X_p$ and $R_i(x)$. In other words, $X_L$ may be the inputs or feature data that apply to the $i^{th}$ rule. $X_L$ may then be perturbated, and $X_{LP}$ may denote the combination of $X_L$ and a locally perturbated dataset of Perturbate($X_L$). Thus, $Y_L = \text{Predict}(X_{LP})$. Finally, $X_T$ may be calculated by finding a transformation of $X_{LP}$, such that $X_T$=Transform($X_{LP}$). The transform function may be a pipeline of transformations, including but not limited to polynomial expansions, rotations, dimensional and dimensionless scaling, Fourier transforms, integer/real/complex/quaternion/octonion transforms, Walsh functions, state-space and phase-space transforms, Haar and non-Haar wavelets, generalized L2 functions, fractal-based transforms, Hadamard transforms, Type 1 and Type 2 fuzzy logic, knowledge graph networks, categorical encoding, difference analysis and normalization/standardization of data. The transform function pipeline may further contain transforms that analyze sequences of data that are ordered according to the value of one or more variables, including temporally ordered data sequences. $X_T$ may generate new features, such that z represents the total number of features by the transformation function.

For each j in the range of 1 through n (i.e. the number of outputs), the system may calculate the local model in a linear manner. $Y_L$ is a matrix consisting of n vectors, one for each output, such that $Y_{Lj}$ represents the $j^{th}$ output vector. The linear model can be defined by $Y_{ij}$=Fit($X_T$,$Y_{Lj}$) where Fit is a function that fits a linear model, such as linear regression, logistic regression, kernel method, etc. The linear model defines a set of coefficients $\{\beta_0 \ldots \beta_z\}$ such that $Y_{ij}$=$\beta_0$+$\beta_1 x_1$+ $\ldots$ +$\beta_i x_i$+ $\ldots$ +$\beta_z x_z$. In an alternative embodiment, the fit of the local models may be achieved in one atomic Fit function using parallel programming or gradient-descent techniques, or a suitable equivalent. Note that $x_i$ could be a transformed feature such as polynomial (such as $x^2$), intersection (such as xy), conditional features (such as x>10 and y<2), Fourier transforms, etc. Note that $\beta_i$ could be either positive or negative, corresponding to positive or negative contributions to the model for the relevant transformed feature. The positive or negative contributions may also be commonly referred to as excitatory and inhibitory influences. Compression or regularization techniques may also be applied to simplify the fit of the local models, which indirectly also simplifies the resulting explanations.

Finally, rules may be constructed from the various combinations of $Y_{ij}$.

$$Rule_1(x)=\{Y_{11}, Y_{1,2}, \ldots, Y_{i,n}\} \text{ if } R_1(x)$$

$$Rule_2(x)=\{Y_{21}, Y_{2,2}, \ldots, Y_{2,n}\} \text{ if } R_2(x)$$

$$Rule_i(x)=\{Y_{i1}, Y_{i,2}, \ldots, Y_{i,n}\} \text{ if } R_i(x)$$

$$Rule_k(x)=\{Y_{k1}, Y_{k,2}, \ldots, Y_{k,n}\} \text{ if } R_k(X)$$

Further, additional functions may be applied to the final output of the rule. For example, the softmax function may be used for rules that define a multiclass classification system, such that:

$$Rule_i(x) = \text{Softmax}(\{Y_{i1}, Y_{i,2}, \ldots, Y_{i,n}\}) \text{ if } R_i(x), \text{ and}$$

$$\text{Softmax}(x_i) = \frac{e^{x_i}}{\sum_n e^{x_n}}$$

In an alternate exemplary embodiment, the sigmoid function may be applied to the output for application to a binary classification algorithm, such that:

$$Rule_i(x) = \text{Sigmoid}(Y_{i1}) \text{ if } R_i(x)$$

$$\text{Sigmoid}(x) = \frac{1}{1+e^{-x}}$$

Figure 5:
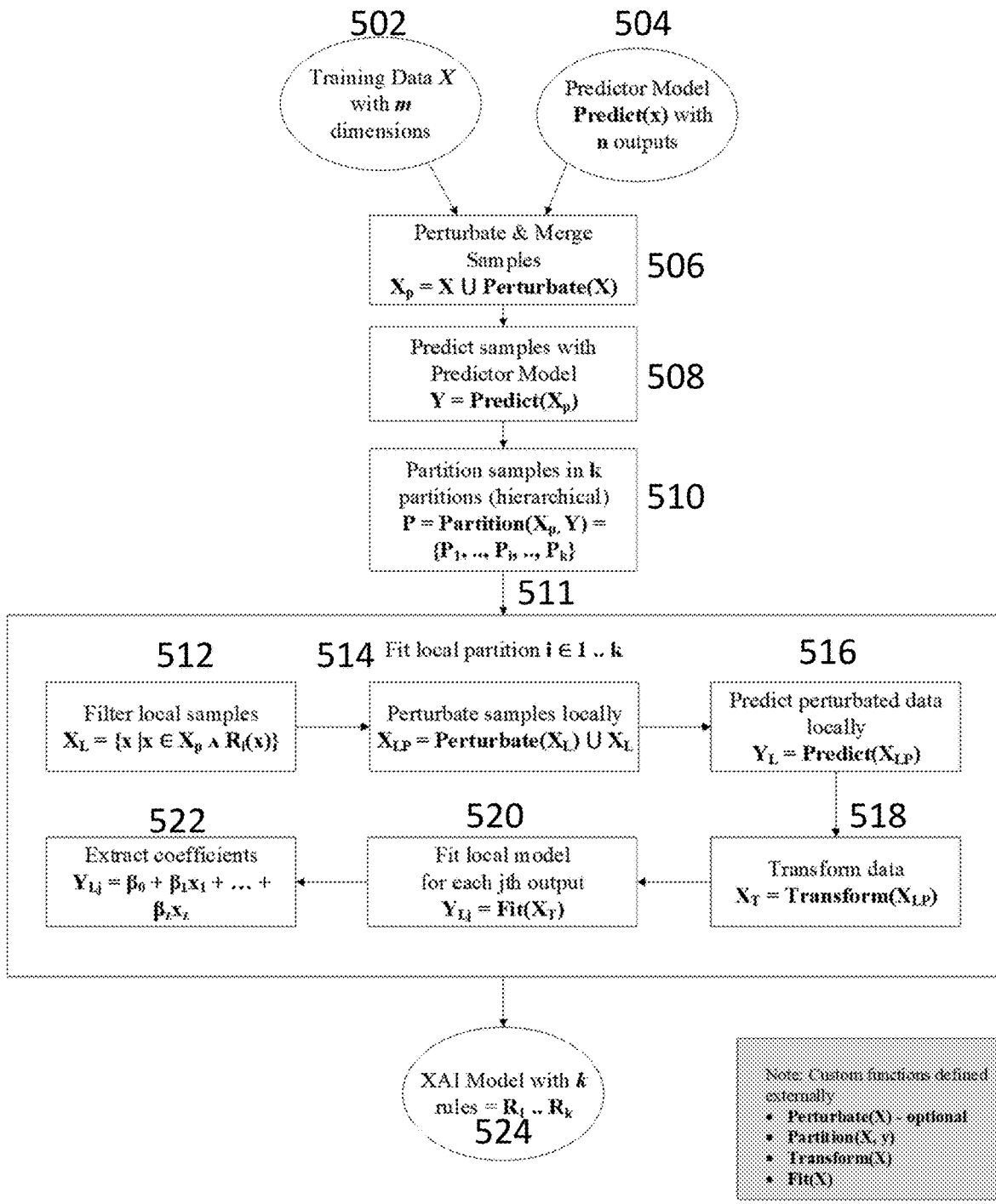
FIG. 5 is an exemplary diagram illustrating the model induction process.

Referring now to exemplary FIG. 5, FIG. 5 may depict the model induction process. In an exemplary embodiment, training data X with m dimensions may be created 502. Additionally, a predictor model Predict(x) with n outputs may be initially created, where Predict(x) has n outputs 504. In a next exemplary step, the input training data may be perturbated and the various samples may be merged 506. A predictor model, such as Y=Predict($X_p$), may predict sample outputs in another step 508. Further, the samples may be partitioned into k hierarchical partitions 510, such that P=Partition ($X_p$, Y)=$\{P_1, \ldots, P_i, \ldots, P_k\}$. Partition(X,Y) may be a function configured to partition the samples of data. Such partitioning function may consist of a clustering algorithm such as k-means, Bayesian, connectivity based, centroid based, distribution based, grid based, density based, fuzzy logic based, entropy, a mutual information (MI) based method, or any other logically suitable methods. The partition function may also include an ensemble method which would result in a number of overlapping or non-overlapping partitions. In the case of overlapping partitions, an aggregation function may be used to combine the result from multiple partitions. The partition function may alternatively include association based algorithms, causality based partitioning or other logically suitable partitioning implementations. Next, the k partitions may be fit into local models 511. This may be accomplished by first filtering local samples 512, then perturbating the samples locally, and combining the perturbated samples with the filtered local samples 514. Then, the model may predict perturbated data locally using the Predictor model 516. Additionally, the data may be transformed using one of a variety of transformation formulas 518. A local model may be fitted for each $j^{th}$ output, such that $Y_{Lj}$=Fit($X_T$) 520. As a final step of the local partition fitting, coefficients may be extracted from the local model $Y_{Lj}$ 522. In an alternative embodiment, the fit 511 may be reconfigured to implement the inner functions in parallel or as an atomic operation. For instance, perturbation for each local model may be implemented in a single step, while transformation and fit of all the local models may be implemented in another single step. In an exemplary implementation, it may be contemplated that multiple local models which represent the individual partitions may be fitted concurrently using gradient descent techniques. In an alternative embodiment, the fit of the local models may also serve as feedback to improve the partitioning process in a global manner, thus enabling a global refinement process. Feedback may be implemented using gradient-descent methods. In a final exemplary step, the XAI model with k rules may be created using the local partitions and extracted coefficients 524.

The exemplary mathematics demonstrated in FIG. 5 may be further illustrated by the following example. Given m=2, which may represent the number of dimensions (2-dimensions, an x-axis and a y-axis). Further, in this example k=4, which may represent 4 rules, $R_0$, $R_1$, $R_2$, $R_3$. Extracting the partitions based on these four rules may reveal the rules to be, for example, $R_1$=x≤10

$R_2$=x>10∧x≤20

$R_3 = x > 20 \wedge y \leq 15$ $R_4 = x > 20 \wedge y > 15$

The partition membership function depends on the choice of Partition function or functions and is a key choice in the resulting explainability of the induced model. The partition types and characteristics may also be determined by the choice of Partition function or functions. Suitable partition types include linear, Bayesian and curvilinear partitions, including continuous and non-continuous segmented partitions, such as Bezier curve segments, and other suitable partition types that lend themselves to explainability and interpretability. In topological terms, the model induction method may use the Partition function or functions to transform the predictor model computational data space from a T0 (Kolmogorov), T1 (Frechet), T2/T3/T4/T5/T6 (Hausdorff) and T3½ (Tychonoff) space into a T2/T3/T4/T5/T6 (Hausdorff) and T3½ (Tychonoff) space used by the induced white-box model.

In this exemplary embodiment, the Transform function may be applied as a polynomial expansion. The polynomial expansion may introduce additional features, such as the $x^2$, $y^2$ features and the intersection, defined by $xy$, in addition to the original features x and y. After the transformation, a local model may be applied using a linear method. In this exemplary embodiment, a logistic regression may be applied as would be used for a classification algorithm. As a result, the following local fits may be produced:

$Y_1 = \text{Sigmoid}(\beta_0 + \beta_1 x + \beta_2 y + \beta_3 xy)$ $Y_2 = \text{Sigmoid}(\beta_4 + \beta_5 xy)$ $Y_3 = \text{Sigmoid}(\beta_6 + \beta_7 x^2 + \beta_8 y^2)$ $Y_4 = \text{Sigmoid}(\beta_9 + \beta_{10} y)$ Finally, the local fits above may be combined with the local fits to produce the following rule-based model:

$$f_r(x, y) = \begin{cases} \text{Sigmoid}(\beta_0 + \beta_1 x + \beta_2 y + \beta_3 xy), & x \leq 10 \\ \text{Sigmoid}(\beta_4 + \beta_5 xy), & x > 10 \wedge x \leq 20 \\ \text{Sigmoid}(\beta_6 + \beta_7 x^2 + \beta_8 y^2), & x > 20 \wedge y \leq 15 \\ \text{Sigmoid}(\beta_9 + \beta_{10} y), & x > 20 \wedge y > 15 \end{cases}$$

Figure 6:
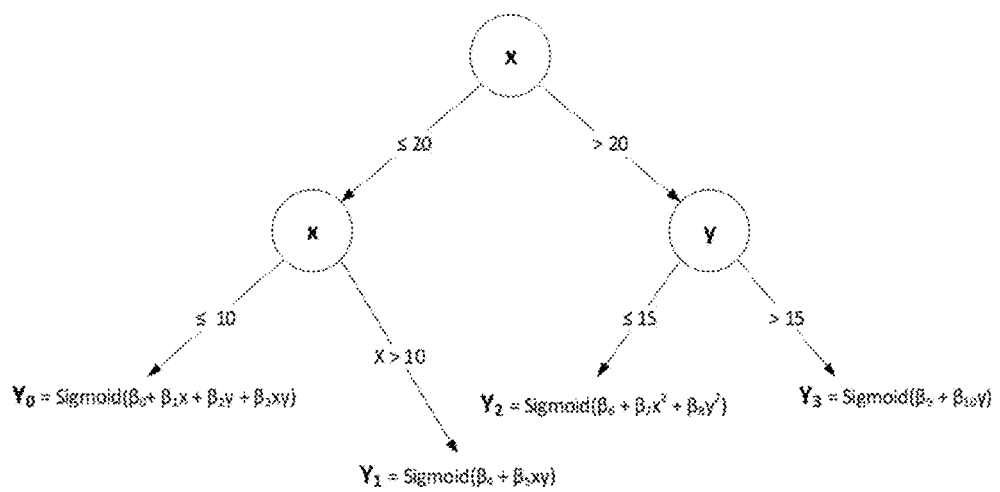
FIG. 6 is an exemplary diagram illustrating the hierarchical partitions of a set of exemplary rules.

The interpretation of these equations may be a method to generate explanations. Explanations may be in the form of text, images, audiovisual, etc. The Transform function may be used to extract explanations via, for example, coefficients and the underlying equations. In the example above, the coefficients $\{B_0, \ldots, B_{10}\}$ indicate the feature importance. In an example, let x=5 and y=20, in the XAI model function defined by $f_r(5,20)$, this would trigger the first rule, that is $\text{Sigmoid}(\beta_0 + \beta_1 x + \beta_2 y + \beta_3 xy)$ when x≤10. Expanding the equation would result in: $\text{Sigmoid}(\beta_0 + \beta_1 5 + \beta_2 20 + \beta_3 100)$. From this equation the multiplication of each coefficient and variable combination may be extracted into a set defined by $R = \{\beta_1 5, \beta_2 20, \beta_3 100\}$. $B_0$ may be ignored for the purpose for feature importance. When sorting R, the most important coefficient/feature combination may be determined. This "ranking" of coefficients/features may be utilized to generate explanations in a textual format, in the form of a heatmap for images, or any other contemplated form. Other methods of explanations that utilize the explanation coefficients in a different manner may be used. The underlying equations may affect the order and filtering applied to the resulting explanations. The use of causal models will further affect the generation of the resulting explanations, including the generation of interventional and counterfactual explanations. Base explanations can then be further modified according to a user and world model combined with a goal-action plan and other relevant information available to the system. Referring now to exemplary FIG. 6, FIG. 6 may illustrate the above rules showing the hierarchical partitions.

The use of the induced XAI model enables a number of additional AI use cases going beyond rule-based models, including bias detection, causal analysis, explanation generation, conversion to an explainable neural network, interpretable neural network, explainable transducers and transformers, explainable spiking networks, explainable memory networks, explainable reinforcement learning, deployment on edge hardware and integration with expert systems for human-assisted collaborative AI. The induced model may be expressed in a universal format or may be used directly. It may be contemplated that a logically equivalent process to this induction method, or parts of it, may be re-created using an appropriate machine learning system that has been trained appropriately, for example, via gradient descent techniques, such as neural networks, transducers, transformers, autoencoders, spiking networks, memory networks, and/or reinforcement learning systems.

The summarization technique may provide a method for simplifying explanations. In the case of high-degree polynomials (2 or higher), the technique may extract simpler features. For example, an equation may have the features x, $x^2$, y, $y^2$, $y^3$, xy with their respective coefficients $\{\theta_1 \ldots \theta_6\}$. The resulting feature importance is the ordered set of the elements $R = \{\theta_1 x, \theta_2 x^2, \theta_3 y, \theta_4 y^2, \theta_5 y^3, \theta_5 xy\}$. Elements may be grouped irrespective of the polynomial degree for the purposes of feature importance and summarized explanations. In this exemplary case, the simplified result set is $R_s = \{\theta_1 x + \theta_2 x^2, \theta_3 y + y^2 + \theta_5 y^3, \theta_5 xy\}$. A simplified explanation may also include a threshold such that only the top n features are considered, where n is either a static number or percentage value. Other summarization techniques may be utilized on non-linear equations including but not limited to polynomial equations, state-space and phase-space transforms, Fourier transforms, etc.

The interpretation of the XAI model can be used to generate both human and machine readable explanations. Human readable explanations can be generated in various formats including natural language text documents, images, diagrams, audio, speech, videos, verbally, 3D data, and other appropriate formats. Machine interpretable explanations may be represented using a universal format or any other logically equivalent format. Further, the resulting model may be a white-box AI or machine learning model which accurately captures the original model, which may have been a non-linear black-box model, such as a deep learning or ensemble method. Any model or method that may be queried and that produces a result, such as a classification, regression, or a predictive result may be the source which produces a corresponding white-box explainable model. The source may have any underlying structure, since the inner structure does not need to be analyzed.

Additionally, the extracted model may be global such that it captures the entire multi-dimensional space of the original model. The global model may be fully interpretable, even if the original model was not, and may still maintain a high-level of model performance or accuracy. The explanation may be completed simultaneously and in parallel with the answer and there may be no performance loss.

An extracted white-box model may have advantages not present in the original model. The extracted model may be suitable for applications where low latency is required, such as real-time or quasi real-time environments, for example when used in autonomous vehicles or medical surgery robots. The system may use a space efficient transformation to store the model as compactly as possible using a hierarchical level of detail that zooms in or out as required by the underlying model. As a result, it may be deployed in hardware with low-memory and a small amount of processing power. This may be especially advantageous in various applications. For example, a low power chip may be implemented in a vehicle. The addition of the low power chip may be significantly less expensive than a black-box model which needs to be implemented on a higher-powered chip. Additionally, a model which requires internet connectivity may be converted into a white-box model that can be implemented in a low power chip that does not require internet connectivity. Further, the resulting white-box model may be embodied in both software and hardware. Since the resulting white-box model is a complete representation of the original input model, it does not need any network or online processing and may work entirely offline. It may be contemplated that a hardware embodiment of the induction method and/or the resulting white-box model may be implemented either using flexible architectures like FPGAs or more static architectures like ASICs or analog/digital electronics.

The resulting XAI (explainable AI) model may be represented using first order symbolic logic, making it computationally equivalent to known programming languages and applicable to any computing devices. The nature of the extracted model may enable it to form the foundation of a number of XAI methods, causal logic extraction methods, human knowledge incorporation and adjustment/feedback techniques.

In an exemplary embodiment, the system may automatically adapt to different regions of detail.

Referring now to exemplary FIG. 1 may illustrate an exemplary method for extracting an explainable white-box model of a machine learning algorithm from a black-box machine learning algorithm. In an exemplary first step, synthetic data and/or training data may be created or obtained 102. Perturbated variations of the set of synthetic data and/or training data may also be created so that a larger dataset may be obtained without increasing the need for additional synthetic data and/or training data, thus saving resources. It may be contemplated that the synthetic data and/or training data may be normalized prior to step 102 or within any of the steps 102, 104, 106, 108, 110, 112 and 114, using a suitable normalization method, such as min-max scaling, standard scaling or other suitable method. It may be further contemplated that an inverse normalization method be applied prior to step 102 or within any of the steps 102, 104, 106, 108, 110, 112 and 114, using an appropriate inverse of any normalization method that was applied. The synthetic data and/or training data may then be loaded into the black-box system as an input 104. The black-box system may be a machine learning algorithm of any underlying architecture. In an exemplary embodiment, the machine learning algorithm may be a deep neural network (DNN). The black-box system may additionally contain non-linear modelled data. The underlying architecture and structure of the black-box model may not be important since it may not be analyzed directly. Instead, the synthetic data and/or training data may be loaded as input 104, and the output can be recorded as data point predictions or classifications 106. Since a large amount of broad synthetic data and/or training data was loaded as input, the output data point predictions or classifications may provide a global view of the black-box algorithm. In an alternative embodiment, the black-box model may be split in a suitable manner such that only parts of it are induced by the induction method. For example, in the case of a convolutional neural network (CNN), only the fully connected non-convolutional layers may be induced, leaving the preceding layers (convolutional and pooling layers) to serve as transformed input to the induction method.

Still referring to exemplary FIG. 1, the method may continue by aggregating the data point predictions or classifications into hierarchical partitions 108. Rule conditions may be obtained from the hierarchical partitions.

The process to find the partitions is, or the boundary of the partition, is an external function defined by Partition(X). Partition(X) may be a function configured to partition similar data, and may be used to create rules. The partitioning function may include a clustering algorithm such as k-means, Bayesian, connectivity based, centroid based, distribution based, grid based, density based, fuzzy logic based, entropy or a mutual information (MI) based method. The partition function may alternatively include association based algorithms, causality based partitioning or other logically suitable partitioning implementations.

The hierarchical partitions may organize the output data points in a variety of ways. In an exemplary embodiment, the data points may be aggregated such that each partition represents a rule or a set of rules. The hierarchical partitions may then be modeled using mathematical transformations and linear models. Any transformation function or combination of transformation functions may be used, including but not limited to polynomial expansion, convolutional filters, fuzzy membership functions, integer/real/complex/quaternion/octonion transforms, Fourier transforms, and others. Such transformation function or combination of transformation functions may be applied prior to step 108 and/or during step 110. An exemplary embodiment may apply a polynomial expansion. Within step 108, the hierarchical partitions may also be subject to one or more iterative optimization steps that may optionally involve merging and splitting of the hierarchical partitions using some suitable aggregation, splitting, or optimization method. A suitable optimization method may seek to find all paths connected topological spaces within the computational data space of the predictor while giving an optimal gauge fixing that minimizes the overall number of partitions. Further, a linear fit model may be applied to the partitions 110. Additional functions and transformations may be applied prior to the linear fit depending on the application of the black-box model, such as the softmax or sigmoid function. The calculated linear models obtained from the partitions may be used to construct rules or some other logically equivalent representation 112. The rules may be stored in any medium. For example, the rules may be stored as mathematical equations or may be represented using first order symbolic logic. Storing the rules as such may allow the extracted model to be applied to any known programming language and may be applied to any computational device. Finally, the rules may be applied to the white-box model 114. The white-box model may store the rules of the black-box model, allowing it to mimic the function of the black-box model while simultaneously providing explanations that the black-box model may not have provided. Further, the extracted white-box model may parallel the original black-box model in performance, efficiency, and accuracy. The extracted white-box model W that is the result of conversion of the input predictor model U via the induction method, is an approximate or perfect bisimulation of U, i.e. W~U. The degree of bisimulation between the induced white-box model and the original predictor model is a parameter that can be set during steps 108, 110, 112 and 114. In terms of model and output interpretability, bisimulation is generally concerned with output interpretability in the case of the extracted model that is the end result of the induction method.

Figure 2A:
FIG. 2A is an exemplary embodiment of an output of a black-box image classification algorithm.
Figure 2A:
Figure 2B:
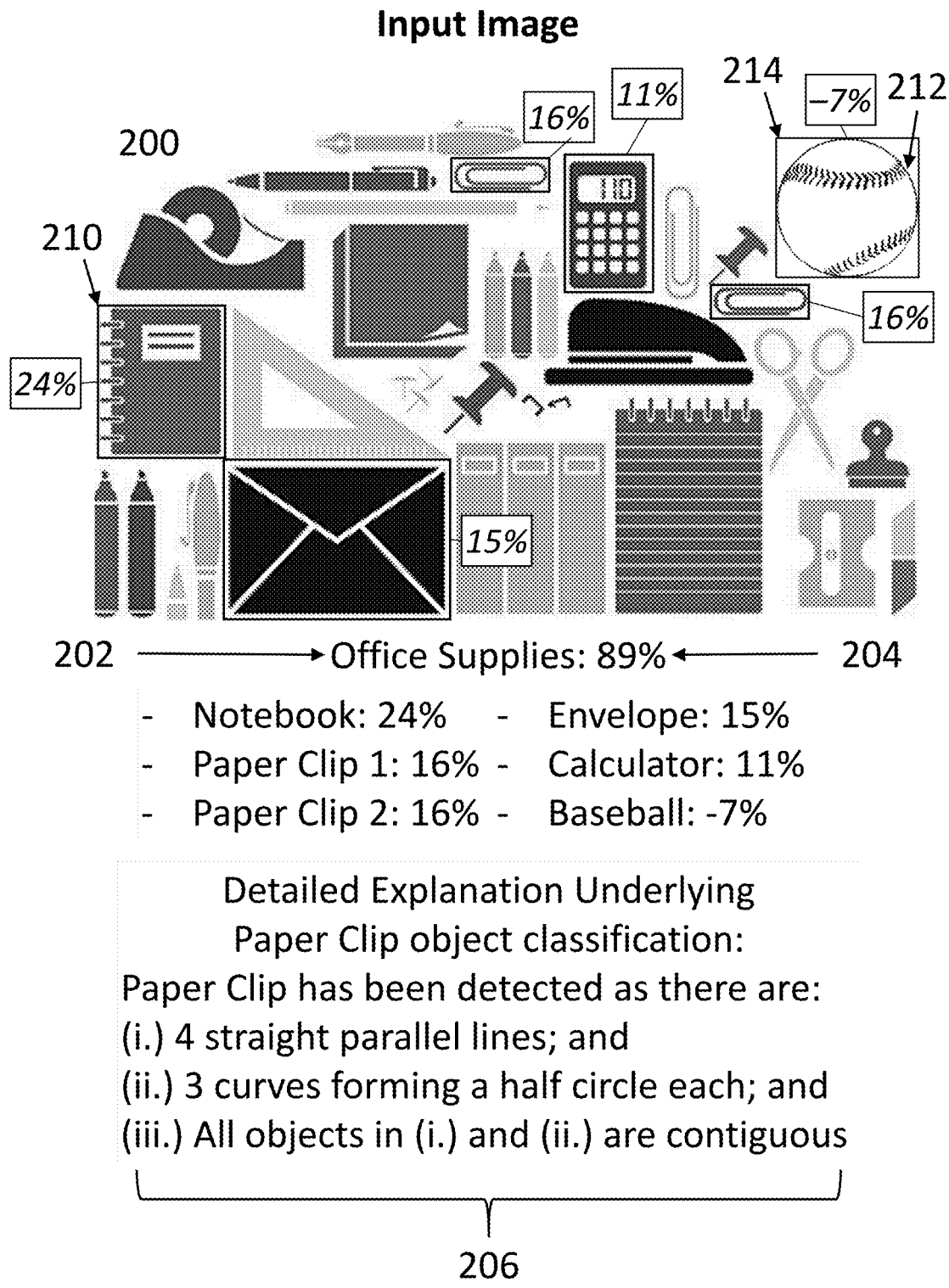
FIG. 2B is an exemplary embodiment of an output of a white-box image classification algorithm.

Referring now to exemplary FIGS. 2A and 2B, FIG. 2A may show the output of a black-box image classification algorithm, and FIG. 2B may show the output of a white-box image classification algorithm that is extracted from the black-box algorithm of FIG. 2A. The same image 200 may be loaded as input into both the black-box algorithm of FIG. 2A and the white-box algorithm of FIG. 2B. As seen in exemplary FIG. 2A, the black-box algorithm may output a label of the classification of the image, in this case the label being "Office Supplies". Further, the black-box algorithm may or may not additionally present a percent chance that the prediction is accurate. The black-box model in this embodiment does not provide any other information as output other than the classification.

FIG. 2B may show the output of the white-box model extracted from the black-box model. The white-box model may return the classified image along with a classification label 202. The white-box model also classified the image as "Office Supplies". Additionally, the white-box model may return a figure representing the accuracy of the model 204. The accuracy may be presented as a percent chance that the labeled classification is accurate. In this case, the model calculated an 89% chance that the returned classification is correctly labeled as "Office Supplies". Further, the white-box model may return an explanation 206 for the label 202. The explanation may consist of multiple levels of detail, up to a single object level. Explanations are generated mathematically and then converted to a human readable format using a separate process, thus allowing for flexibility and generality in the generation of the explanations themselves. Explanations may take the form of text, diagrams, images, etc. An exemplary detailed explanation 206 corresponds to the label 202.

In this exemplary embodiment, the explanation 206 may consist of a list of variable or factors which led to the final classification. For example, the algorithm may identify that there is a notebook 210 within the image. The notebook 210 may indicate that there is a 24% chance that the image should be classified as "Office Supplies". The 24% may be calculated from the rules which were extracted from the black-box model. Additionally, other factors which led to the conclusion that the image should be classified as "Office Supplies" may also be listed. In this exemplary embodiment, the elements may be listed in the order of importance or impact on the final decision so that a user may quickly identify the key factors leading to the conclusion. The algorithm may also identify objects which reduced the chance that the classification is correct, such as the baseball 212. The exemplary white-box model in this case calculated that the baseball 212 reduced the chance that the classification is correct by 7%. This rule and percentage may be obtained from the rules of the white-box model. In this exemplary embodiment, additional features of the input image 200 may have been identified, such as the pens, markers, stapler, or other notebooks, however, they may have had a smaller effect on the output. The output explanations may be configured to display only the features which have the greatest impact on the final determination so that a user is not presented with and overwhelmed by a large amount of insignificant information. It may be contemplated that all the objects inside of input image 200 were identified, and that only the relevant features were presented to the user. The threshold for which features are presented may be set by the user or by the algorithm. The threshold may be a certain number of features, such as the top 6 features. Alternatively, the threshold may be a percentage, for example, the algorithm may present any features which impacted the final result by greater than 5%. The level of detail to be presented to the user may also be affected by a user model that is already known to the system and may depend on a combination of the level of expertise of the user, familiarity with the model domain, the current goals, current session, user and world model, and other relevant information that may be utilized in the personalization of the explanation. Parts of the explanation may be hidden or displayed or interactively collapsed and expanded for the user to maintain the right level of detail.

In a further exemplary embodiment, the white-box model may illustrate explanation 206 on the input image, such as by enclosing the identified factors in a box. For example, the baseball 212 may have a box 214 surrounding it along with the calculated percentage which the baseball contributed to the overall finding. In an exemplary case involving images, the underlying visual features that led the system to label the object may also be presented. The visual representation can take any form. The most important factors which contributed the most to the conclusion may be highlighted, while other factors which only contributed slightly to the conclusion may be ignored so as to provide the user with a moderate, as opposed to excessive, amount of information to process.

FIGS. 2A and 2B offer just one example of how the white-box explainable artificial intelligence model may provide both textual and visual explanations for the rules that were extracted from a black-box model. The extraction method may be applied to any black-box model which may be far more complex than an image classification algorithm. The output may be in the form of percentages and factors, such as in FIG. 2B, or may alternatively take the form of a list of rules, variables, discrepancies, or any other data that may assist a user in understanding the conclusion.

Figure 3:
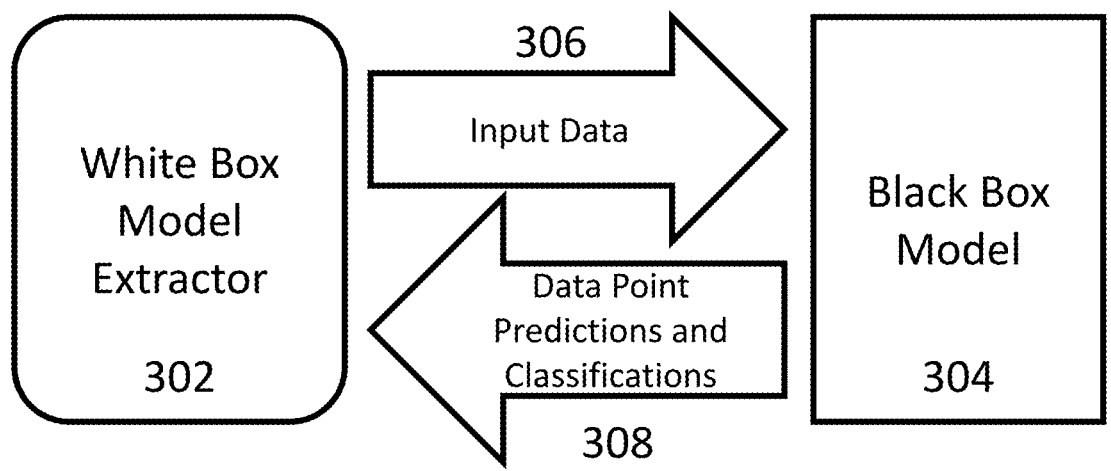
FIG. 3 is an exemplary flow chart depicting the interaction between a white-box model extractor and a black-box model.

Referring now to exemplary FIG. 3, FIG. 3 may illustrate the interaction between the white-box model extractor 302 and the black-box model 304. In an exemplary embodiment, the black-box model may be any black-box machine learning algorithm. Further, it is not necessary that the model be a black-box model. The model may be another white-box model which the user seeks to further analyze. The white-box model extractor 302 may provide an input to the black-box machine learning algorithm 304. Synthetic data may be generated by the model extractor 302 or by an external process and may be combined with the input data. Training data may instead be used as the input, or the input may come from another process, such as a simulation system or a reinforcement learning model. The input may be perturbated. The black-box machine learning algorithm 304 may then perform as it was designed to and may output whatever output it was designed to return. The output may be in any form and may be used as data point predictions and classifications 308 which the white-box model extractor 302 may process. After processing the data points to define a set of rules corresponding with the rules of the black-box machine learning algorithm 304, the white-box model extractor 302 may apply those rules to the white-box model.

The process may be iterative, and additional input data 306 may then be loaded into the black-box model 304 to produce additional data point predictions and classifications 308. The additional data points may be different than the original data points in order to cover a new part of the black-box machine learning algorithm 304 and produce or discover a new rule associated with it. Input data 306 may be continuously loaded and the corresponding data point predictions and classifications 308 may be continuously processed until the white-box model completely parallels the black-box model. The two models may have different underlying structures or architectures but may still follow the same rules such that an input will produce the same output from both models. The white-box model extractor may have a module which can compare the rules of the two models. The module may input a set of data and check to ensure that the output of both models is the same. If the output of both models is not the same, the white-box model extractor may produce additional synthetic data 306 and begin the process again in order to define the unknown rules. The additional synthetic data 306 may be directed such that they may produce data point predictions and classifications 308 from the black-box model 304 which are different from the previously obtained data points, in order to define different rules.

In a further exemplary embodiment, the white-box model may be converted into a general explainable neural net. The performance and accuracy of the original white-box model may be maintained. The lossless transformation may preserve all the underlying characteristics of the original model. Further, various performance enhancements may be carried out on the resulting explainable neural network output method. This may enable the utilization of all existing artificial neural net libraries including deep learning and other related methods.

In another exemplary embodiment, the extracted model may be converted or integrated into a causal machine learning algorithm or XAI. By integrating causal logic models, the explanations may be supported by causality. By implementing causality, the explanations may include logical explanations such as 'what-if' and 'what-if-not' analyses and use causal logic tools such as interventions and counterfactuals. The AI may then have the power of cause and effect inference capabilities while still preserving the advantages of the XAI architecture.

Figure 7:
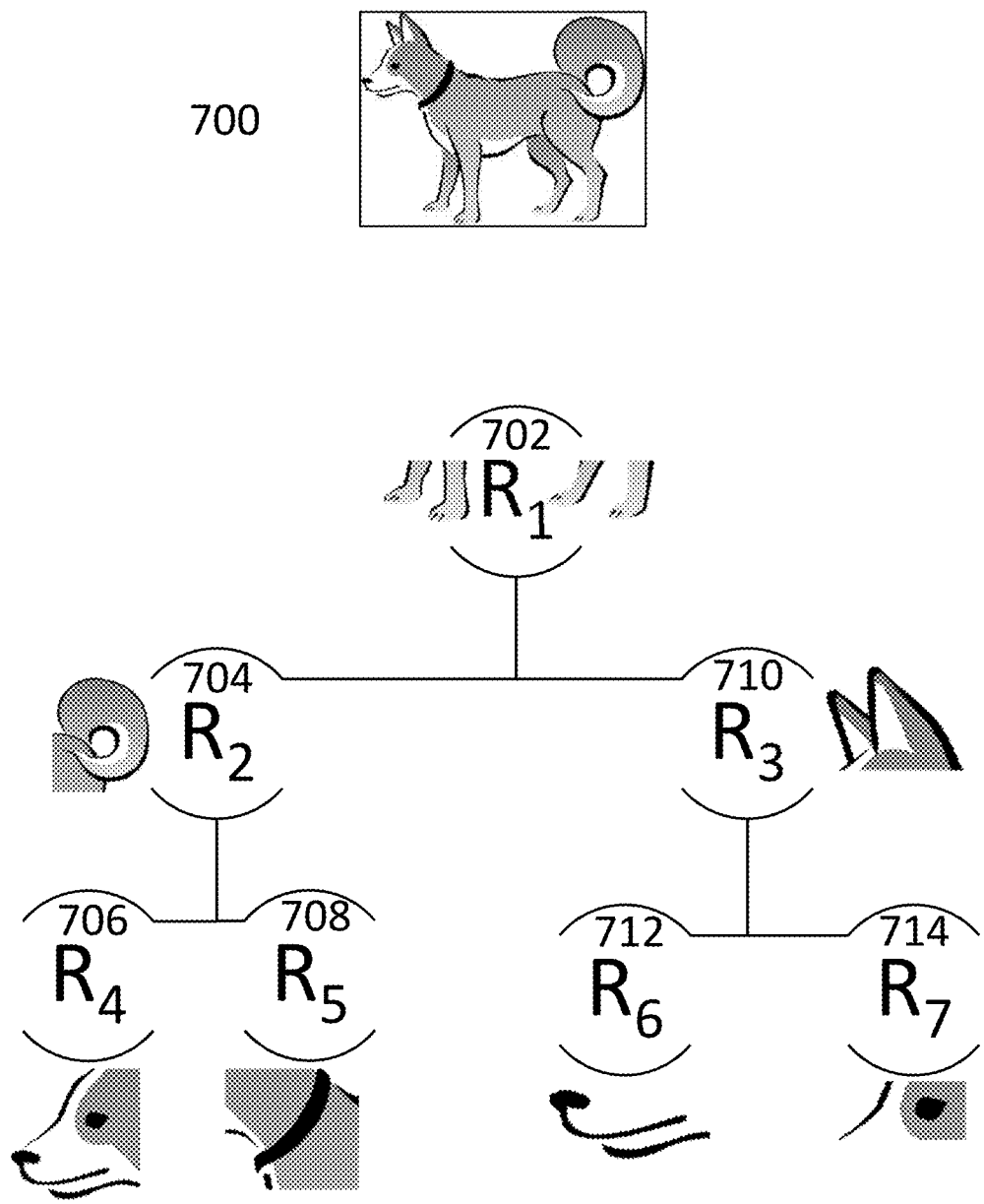
FIG. 7 is an exemplary diagram illustrating the inner structure of an exemplary explainable AI system.

The extracted white-box model may itself be an independent white-box explainable AI system. Referring now to FIG. 7, FIG. 7 may depict the inner structure of an explainable AI system. The image of a dog may be the input 700 to the AI system. In this exemplary embodiment, the AI may be an image classifying algorithm. The system may classify the input image by applying a set of rules to the image and analyzing whether or not the rules are satisfied. This exemplary embodiment may implement a hierarchical structure to the rules, although a linear or other structure may be applied as well. An exemplary embodiment may first analyze a portion of the dog, such as the legs 702. $R_1$ may be a rule which is triggered when an object with 4 legs is detected. Since $R_1$ was triggered by the input image, the system may then be directed to apply rules $R_2$ and $R_3$ to the input image. Rule $R_2$ may be a conditional rule which may be triggered by the appearance of a tail 704. The rule may be stored or formulated in the disjunctive normal form. Rule $R_2$ may be triggered by conditions such as a thin object which protrudes from another, thicker object of the same or a similar color (the body) which also satisfy $R_1$ (the rule which identified the legs). Once rule $R_2$ has been satisfied, the AI may be directed to rules $R_4$ and $R_5$. Rule $R_4$ may identify the snout 706 of the dog. It may be triggered by multiple conditions, such as the detected presence of a rounded nose, eyes, and a mouth resembling that of other dogs. Rule $R_5$ may be an additional rule which is triggered by the presence of a collar 708. Rule $R_5$ may not be necessary for the classification, however, $R_5$ may increase the chances that an accurate classification was made.

Additionally, the system may have been directed to rule $R_3$ after $R_1$ was triggered. Rule $R_3$ may analyze the ears of the dog in the input image. In this exemplary case, rule $R_3$ may be triggered by the presence of cat-like ears 710. The system may detect that the dog in the input image has pointy ears, a characteristic common to many cats. As a result, the input image may further compare features of the input image to common cat features. Since rule $R_3$ may have been triggered by the pointy ears of the input image, the system may be directed to rules $R_6$ and $R_7$. Rule $R_6$ may compare the nose 712 of the input image to the noses of various cats, or the common shape of cat snouts. The conditions of rule $R_6$ may include a short snout with whiskers and pointed teeth. This rule may not be triggered by the input image. Further, rule $R_7$ may compare the distinctive features of the eyes of a cat to the eyes 714 of the input image. This rule may be triggered by the distinctive vertical pupils found on cats. Since rule $R_6$ and $R_7$ may not be triggered by the input image, the system may recognize that the image would likely not be correctly classified as a cat, even though it may have cat-like ears.

Still referring to the exemplary embodiment of an explainable AI illustrated by FIG. 7, the output may be a classification of the input image, such as "dog". The explainable AI may provide additional information along with the classification. Various rules may be provided or explained to provide insight into the classification. For example, the output may demonstrate that the input image has 4 legs, which directed it to various animals. Further, the output may show the tail of the input image, and how it compares to tails of other various dogs or contains features similar to tails commonly found on dogs ($R_2$). The output may then show the comparison of the snout in $R_5$ to common dog snouts, and the collar analyzed in $R_6$, which may have led to an increased probability that the input image is a dog. The probabilities of accuracy may be presented with each of these explanations of rules. For example, the output may illustrate that there was an 85% chance that the portion of the object analyzed in $R_2$ is a tail. The output may further illustrate the predicted accuracy of the output. For example, the output may illustrate that the tail alone indicated that there was a 12% chance that the object was a dog, or that the tail when detected with the snout and the collar indicates a 78% chance that the input image is a dog.

Additionally, the output may illustrate why the classification is not another object, such as cat. The output may show that although $R_3$ indicates that there is, for example, a 9% chance that the object is a cat due to the pointy ears, $R_7$ did not detect cat eyes and $R_6$ did not detect a cat-like snout, so the probability that the input image is a cat was decreased to 2%.

By demonstrating why a certain output was chosen over another, a user of the artificial intelligence system may be better equipped to apply the results in the real world. Further, the user may analyze the output in order to analyze the underlying artificial intelligence system. The explanations may provide insight into certain biases and incidental errors found in the system, which a user or creator of the system may then repair once they have been identified.

The causal model may further feature strength and bias data. Additionally, inferred data from taxonomies and external knowledge sources may also be implemented. The input may be analyzed and a causal model may be produced which may explain possible circumstances regarding the history of the input. For example, if the input is the occurrence of an event, the causal model may explain the events that may have contributed to the occurrence of the event. Further, appropriate causal models may be identified semi-automatically, such that it may rely on both labeled and unlabeled training data. As a result, causality may be inferred in a supervised or unsupervised manner. This may enable XAI models to analyze causal models for the underlying input data features.

In a further embodiment, an XAI model may incorporate human input to develop the causal model. An alternate exemplary embodiment of the XAI may be implemented in a bias detection system. The system may detect bias, and may further correct unintentional bias. Due to the white-box nature of the XAI models, an exemplary embodiment may suggest corrections in the model to reduce or eliminate bias. Additionally, intentional bias may be purposely introduced into the data as a result of cause and effect.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A computer implemented method for inducing an explainable machine learning model, comprising executing on a processor the steps of:
    inputting a set of data to a first model, said set of data comprising at least one of training data and synthetic generated data;
    recording at least one output of the first model based on the set of data;
    identifying a relationship between at least one input in the set of data and the at least one output, and generating a predicted output of the first model;
    modeling the predicted output of the first model as a set of data points;
    partitioning the set of data points into one or more partitions;
    fitting one or more local models to the one or more partitions, wherein a local model in the one or more local models corresponds to each partition in the one or more partitions, wherein fitting one or more local models to the one or more partitions comprises providing a local partition input to each partition in the one or more partitions and receiving a local partition output for each partition in the one or more partitions, and further comprises formulating, for each of the partitions in the one or more partitions, an equation with one or more coefficients and one or more features corresponding to said partition, which forms one or more transformation functions which are applied to the one or more partitions, wherein each of the one or more coefficients is assigned based on an importance of each of the one or more features in determining a final output;
    forming rules based on the one or more local models;
    representing the rules in a symbolic logic format;
    forming an explainable model with the rules and the one or more local models; and
    generating and outputting, from the explainable model, at least one explanation based on the rules and one or more local models.

2. The computer implemented method of claim 1, wherein generating the predicted output of the first model further comprises perturbating the set of data, inputting the perturbed set of data to the first model, and identifying at least one further relationship based on at least one new input and at least one new output.

3. The computer implemented method of claim 1, wherein the step of identifying the relationship is performed using a non-linear predictor function.

4. The computer implemented method of claim 1, wherein the one or more features comprises a plurality of features.

5. The computer implemented method of claim 1, wherein each of the explanations comprises a confidence interval.

6. The computer implemented method of claim 1, wherein the one or more transformation functions form a transformation function pipeline, wherein the transformation function pipeline comprises one or more linear and non-linear transformations.

7. The computer implemented method of claim 1, wherein the first model is a black-box system having at least one inaccessible inner component.

8. The computer implemented method of claim 1, wherein the step of generating the predicted output comprises using a mapping function that returns a model output for all or part of the input set of data.

9. The computer implemented method of claim 1, further comprising applying a priority to each of the one or more partitions, and resolving a partition overlap based on the priority of an overlapping partition in the one or more partitions.

10. The computer implemented method of claim 1, wherein each partition is generated, in a step of partitioning the set of data points into the one or more partitions, based on one or more of a concept, a feature, or a distinctive category of data.

11. The computer implemented method of claim 1, wherein the one or more partitions are hierarchical.

12. The computer implemented method of claim 1, wherein partitioning the set of data points into the one or more partitions comprises applying a partitioning function or clustering algorithm.

13. The computer implemented method of claim 12, wherein the clustering algorithm is one of the set containing a k-means, Bayesian, connectivity based, centroid based, distribution based, grid based, density based, fuzzy logic based, entropy and a mutual information based method.

14. The computer implemented method of claim 1, further comprising a step of generating an explanation from a rule formed based on the one or more local models, wherein the explanation is presented in a machine-readable format.

15. The computer implemented method of claim 1, wherein the formed explainable model globally captures an entire multi-dimensional space corresponding to the first model.

16. The computer implemented method of claim 1, further comprising a step of generating the synthetic generated data.

17. The computer implemented method of claim 1, wherein the synthetic generated data is generated via an external process and wherein the step of identifying the relationship is performed using a linear predictor function.

18. The computer implemented method of claim 14, wherein each rule is associated with a context, and wherein the context of each rule supplements the formed explanations.

19. The computer implemented method of claim 14, wherein each explanation further comprises an explanation context, wherein the explanation context tailors the explanation to a specific situation.

20. The computer implemented method of claim 14, wherein a result of each rule is associated with an answer context, and wherein the answer context tailors the result to a specific situation.

21. The computer implemented method of claim 6, wherein the transformation functions comprise one or more of polynomial expansions, rotations, dimensional and dimensionless scaling, Fourier transforms, integer/real/complex/quaternion/octonion transforms, Walsh functions, state-space and phase-space transforms, Haar and non-Haar wavelets, generalized L2 functions, fractal-based transforms, Hadamard transforms, Type 1 and Type 2 fuzzy logic, knowledge graph networks, categorical encoding, difference analysis and normalization/standardization of data.

22. The computer implemented method of claim 2, further comprising combining the perturbed set of data with the set of data and inputting the combined data to the first model.

23. The computer implemented method of claim 1, further comprising aggregating two or more overlapping partitions and splitting one or more partitions.

24. The computer implemented method of claim 1, further comprising identifying at least one of an activation function and a ranking function associated with each of the partitions.

25. The computer implemented method of claim 24, wherein the activation function is linear or non-linear.

26. The computer implemented method of claim 1, wherein the at least one explanation is presented in a human-readable format.

27. A non-transitory computer-readable medium containing program code that, when executed, causes a processor to perform steps of:
inputting a set of data to a first model, said set of data comprising at least one of training data and synthetic generated data;
recording at least one output of the first model based on the set of data;
identifying a relationship between at least one input in the set of data and the at least one output, and generating a predicted output of the first model;
modeling the predicted output of the first model as a set of data points;
partitioning the set of data points into one or more partitions;
fitting one or more local models to the one or more partitions, wherein a local model in the one or more local models corresponds to each partition in the one or more partitions, wherein fitting one or more local models to the one or more partitions comprises providing a local partition input to each partition in the one or more partitions and receiving a local partition output for each partition in the one or more partitions, and further comprises formulating, for each of the partitions in the one or more partitions, an equation with one or more coefficients and one or more features corresponding to said partition, which forms one or more transformation functions which are applied to the one or more partitions, wherein each of the one or more coefficients is assigned based on an importance of each of the one or more features in determining a final output;
forming rules based on the one or more local models;
representing the rules in a symbolic logic format;
forming an explainable model with the rules and the one or more local models; and
generating and outputting, from the explainable model, at least one explanation based on the rules and one or more local models.

28. A system for inducing an explainable model, the system comprising a processor and a memory and configured to implement the steps of:
inputting a set of data to a first model, said set of data comprising at least one of training data and synthetic generated data;
recording at least one output of the first model based on the set of data;
identifying a relationship between at least one input in the set of data and the at least one output, and generating a predicted output of the first model;
modeling the predicted output of the first model as a set of data points;
partitioning the set of data points into one or more partitions;
fitting one or more local models to the one or more partitions, wherein a local model in the one or more local models corresponds to each partition in the one or more partitions, wherein fitting one or more local models to the one or more partitions comprises providing a local partition input to each partition in the one or more partitions and receiving a local partition output for each partition in the one or more partitions, and further comprises formulating, for each of the partitions in the one or more partitions, an equation with one or more coefficients and one or more features corresponding to said partition, which forms one or more transformation functions which are applied to the one or more partitions, wherein each of the one or more coefficients is assigned based on an importance of each of the one or more features in determining a final output;
forming rules based on the one or more local models;
representing the rules in a symbolic logic format;
forming an explainable model with the rules and the one or more local models; and
generating and outputting, from the explainable model, at least one explanation based on the rules and one or more local models.

29. A computer implemented method for inducing an explainable machine learning model, comprising executing on a processor the steps of:
building a first model based on a set of data, wherein the set of data comprises at least one of training data and synthetically generated data;
recording at least one output of the first model based on the set of data;
identifying a relationship between at least one input in the set of data and the at least one output, and generating a predicted output of the first model;
modeling the predicted output of the first model as a set of data points;
partitioning the set of data points into one or more partitions;
fitting one or more local models to the one or more partitions, wherein a local model in the one or more local models corresponds to each partition in the one or more partitions, wherein fitting one or more local models to the one or more partitions comprises providing a local partition input to each partition in the one or more partitions and receiving a local partition output for each partition in the one or more partitions, and further comprises formulating, for each of the partitions in the one or more partitions, an equation with one or more coefficients and one or more features corresponding to said partition, which forms one or more transformation functions which are applied to the one or more partitions, wherein each of the one or more coefficients is assigned based on an importance of each of the one or more features in determining a final output;

forming rules based on the one or more local models;

representing the rules in a symbolic logic format;

forming an explainable model with the rules and the one or more local models; and generating and outputting, from the explainable model, at least one explanation based on the rules and one or more local models.

\* \* \* \* \*